United States Patent [15] 3,689,996

Scholes et al. [45] Sept. 12, 1972

[54] MANUFACTURING A PLURALITY OF SEMICONDUCTOR DEVICE HEADERS

[72] Inventors: Geoffrey William Scholes, Totton; Anthony Ronald Jones, Thornhill, both of England

[73] Assignee: U.S. Philips Corporation, New York, N.Y.

[22] Filed: July 29, 1969

[21] Appl. No.: 850,310

Related U.S. Application Data

[62] Division of Ser. No. 639,746, May 19, 1967, abandoned.

[52] U.S. Cl..................29/630 R, 29/630 A, 29/629, 29/624, 29/626

[51] Int. Cl................................................H01r 9/00

[58] Field of Search........29/624, 630 A, 630 R, 626, 29/629

[56] References Cited

UNITED STATES PATENTS 3,375,576 4/1968 Klein..........................29/626

3,426,426 2/1969 Born............................29/624

3,325,881 6/1967 Engdking.....................29/629

*Primary Examiner*—John F. Campbell

*Assistant Examiner*—Donald P. Rooney

*Attorney*—Frank R. Trifari

[57] ABSTRACT

A plurality of semiconductor device headers are manufactured by sandwiching an apertured glass preform between an apertured metal shell and a single patterned metal foil with apertured web portions extending from a surrounding support part of the foil, placing a plurality of metal wires in a jig and through the metal shell, passing the glass preforms and at least one of the wires through the aperture in each of the web portions, locating a brazing ring on the wire adjacent the foil, and heating the jig with metal shell, glass preform, metal foil and wires therein to a temperature sufficient to fuse the glass preform to the metal shell, to the wires, to the metal foil, and the web part to the ring, and finally severing the web parts from the surrounding support part.

5 Claims, 5 Drawing Figures

INVENTORS
GEOFFREY W. SCHOLES
ANTHONY R. JONES
BY
Frank R. Trifari
AGENT

INVENTORS
GEOFFREY W. SCHOLES
ANTHONY R. JONES
BY
Frank R. Trifari
AGENT

INVENTORS
GEOFFREY W. SCHOLES
ANTHONY R. JONES
BY
AGENT

MANUFACTURING A PLURALITY OF SEMICONDUCTOR DEVICE HEADERS

This application is a division of Ser. No. 639,746, filed May 19, 1967, and now abandoned.

This invention relates to methods of manufacturing semiconductor device headers and semiconductor devices comprising such headers.

In the manufacture of semiconductor devices, for example transistors, the semiconductor body is commonly mounted on a header part of an envelope and subsequently hermetically sealed in the envelope with a can forming a cover over the header. Transistors are commonly mounted on a header consisting of a metal shell of circular outline having wires passing through the shell and insulated therefrom by a sealing glass which is chosen to have a thermal coefficient of expansion matched to that of the metal of the shell. The inner end parts of the wires are commonly referred to as "-posts". It is common practice to mount the semiconductor body of the transistor directly on the metal shell with, for example, the collector region connected to the metal shell and separate connections being made between the emitter and base regions and the respective posts.

In certain semiconductor devices, for example, complementary pairs of transistors encapsulated in a single envelope, multiple diodes encapsulated in a single envelope and multi-element integrated circuits encapsulated in a single envelope, two or more semiconductor elements, or other elements according to the specific nature of the device, are mounted on a header of the envelope. In most of such devices it is necessary to insulate the elements from each other and from the metal shell of the header. One method of achieving this is by selectively metallizing parts of the surface of a ceramic member forming part of a header and mounting the elements of the metallized-surface parts. Such headers comprising metallized ceramic parts are generally expensive. Another method of achieving the desired mounting and insulation between the elements and the metal shell of the header is by providing a layer of insulating material on the header and applying a plurality of separate metal strips to the surface of this insulating layer. The elements are each secured, for example, by thermocompression bonding, to a metal strip. In some instances, the strips, referred to as bonding areas, may be connected to the posts and in other instances isolated from the posts. In the former case this has been achieved by forming the strips separately with apertures therein and fitting the strips over the posts or by individually joining the strips to the posts, for example, by brazing. The manufacture of such headers is somewhat complex and expensive. Furthermore due to the complexity of the manufacture the geometry of the metal strips and their relative situation on the glass layer is severely limited thereby. Thus a commonly employed header has three parallel extending metal strips of rectangular outline situated on the glass layer. Further difficulties are involved in the manufacture of headers with strips which are isolated from the posts since the strips have to be located in position before fusion to the glass layer.

According to a first aspect of the invention a semiconductor device header comprises a metal shell, a plurality of a parallel extending metal wires passing through the shell and insulated therefrom, an insulating mass secured to the shell having a substantially flat supporting surface situated within the area surrounded by the inner end parts of the metal wires, and a plurality of mutually insulated metal strips on the supporting surface consisting of web parts of a patterned foil.

The use of a patterned foil having web parts forming the metal strips affords a wider choice for the geometry of the strips and their relative situation on the surface of the insulating mass. Also the use of a patterned foil leads to significant advantages in the manufacture of the header and consequent reduction in cost.

In one form of the header the metal strips consist of web parts of a photo-etched metal foil. In another form the metal strips consist of web parts of a punched out metal foil.

The metal strips may be each connected to the inner end part of a metal wire. Alternatively, at least one of the metal strips may be electrically isolated on the supporting surface and the other metal strips are each connected to the inner end part of a metal wire. Furthermore at least one metal strip may be connected to the metal shell, either connected directly or connected via one of the wires.

The connection of a metal strip to a wire is readily achieved in a simple manner. Thus the connection may be by the wire passing through an aperture in the strip and brazed thereto with the aid of a brazing ring situated on the wire adjacent the metal strip.

The header may comprise a metal shell which has an outer flange and an inner upstanding platform on which the insulating mass is secured, a plurality of apertures being situated around the periphery of the platform each having a metal wire passing therethrough which is insulated from the metal shell by a part of the insulating mass situated within the aperture. In such a header the insulating mass may also extend in the recess in the shell below the upstanding platform.

According to another aspect of the invention in a method of manufacturing a semiconductor device header, an apertured metal shell, an apertured glass preform, a patterned metal foil and a plurality of wires are loaded in a jig the glass preform being sandwiched between the metal shell and the metal foil, the wires passing through the shell and the glass preform, thereafter the jig and contents are heated to a temperature to fuse the glass preform to the metal shell, to the plurality of wires and to the metal foil.

At least one of the wires may pass through an aperture in a web part of the metal foil and a brazing ring is located on the wire adjacent the foil so that during the heating the web part is brazed to the metal wire with the aid of the ring.

The metal shell may comprise an outer flange and an inner upstanding platform having a plurality of peripheral apertures, the jig being loaded with a first apertured glass preform sandwiched between the platform and the metal foil and a second glass preform located in the recess in the shell below the platform, each wire passing through an aperture in the first glass preform, through an aperture in the platform of the metal shell and through an aperture in the second glass preform, heating being carried out to fuse the preforms to the shell and to each other through the apertures in the shell whereby also to insulate the wires from the shell.

The patterned metal foil may consist of web parts extending from a surrounding support part, the web parts are fused to the adjacent glass preform during heating and the surrounding support part is severed from the web parts so fused after heating.

In a method employing such a foil a plurality of semiconductor device headers may be formed simultaneously in a multi-position jig, a single patterned metal foil, for example a photo-etched or punched out metal foil comprising a plurality of web patterns with surrounding support parts is located in the jig and the support parts are severed from the web patterns after heating and prior to removal of the assembled headers from the jig.

Embodiments of the invention will now be described, by way of example, with reference to the accompanying diagrammatic drawings, in which.

Figures 1, 2, 3:
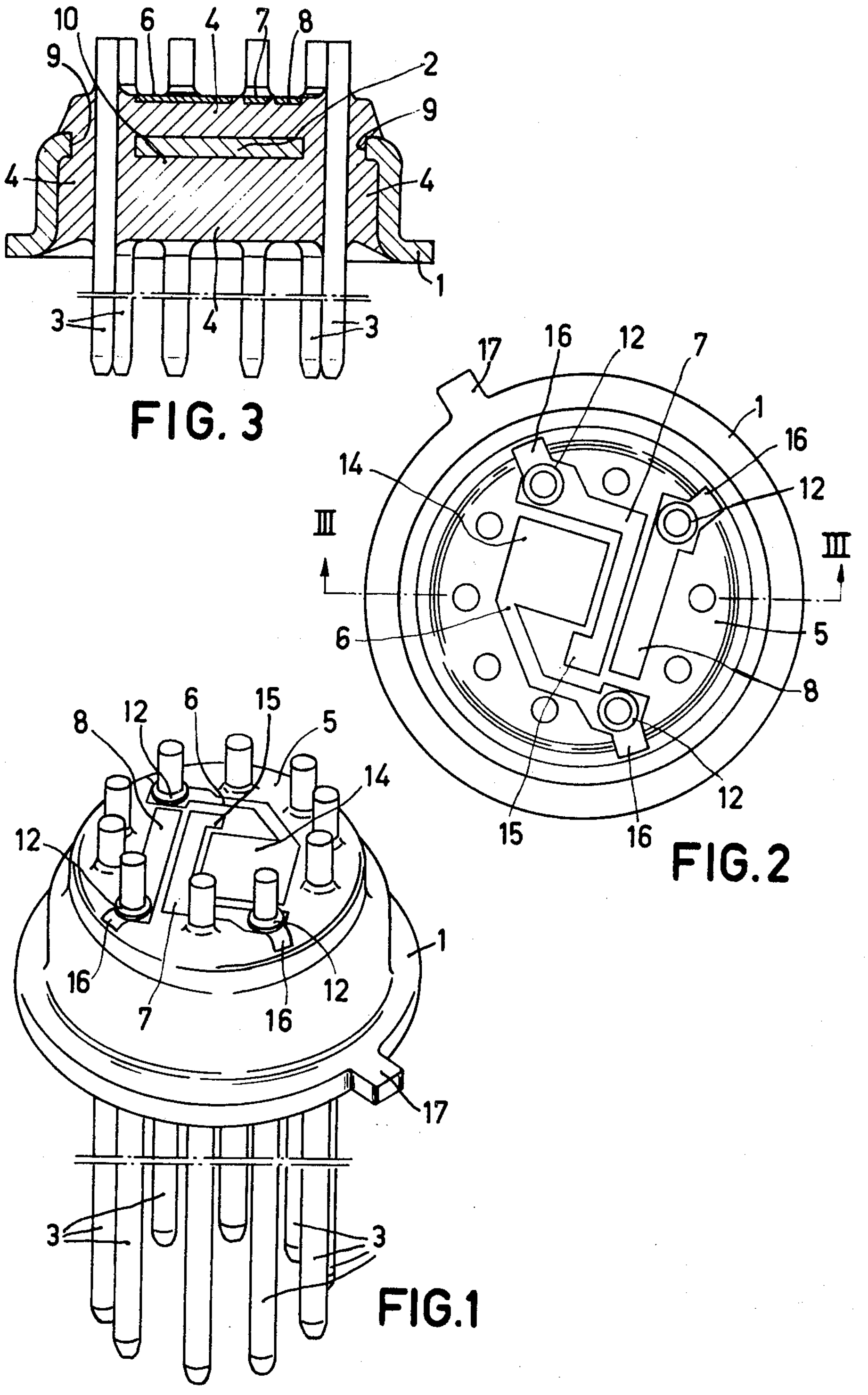
FIG. 1 is a perspective view of a semiconductor device header according to the invention.
FIG. 2 is a plan view of the header shown in FIG. 1.
FIG. 3 is a section through the header taken on the line III—III of FIG. 2.

The semiconductor device header shown in FIGS. 1 to 3 is of TO5 outline, is suitable for an envelope for the encapsulation of a three-element integrated circuit and comprises a shell of a nickel/iron/cobalt alloy such as material available commercially under the Trade Mark KOVAR having an outer flange 1 and an upstanding platform 2, 10 wires 3 of the same nickel/iron/cobalt and passing through the shell, an insulating mass of a borosilicate glass 4 having a thermal expansion coefficient matched to that of the nickel/iron/cobalt alloy secured to the shell having a supporting surface 5, and three strips 6, 7 and 8 on the surface consisting of web parts of a photo-etched foil of the same nickel/iron/cobalt alloy. The wires 3 pass through apertures 9 in the shell situated around the periphery of the platform 2 and are insulated therefrom by parts of the insulating mass 4 extending through the apertures. The insulating mass 4 also extends in a recess 10 in the shell below the platform 2.

The strips 6, 7 and 8 are each fused to the support surface 5 of the insulating mass 4 and at one end have apertures 11 through which the inner end part of a wire 3 passes and the strip is secured thereto with the aid of a silver clad nickel brazing ring 12. The metal strip 6 has a square end portion 14 forming a bonding area for an element of square section. The metal strip 7 has a square end portion 15 forming a bonding area for a further element of square section. The metal strip 8 is of rectangular shape and forms a bonding area for an element of rectangular section. On the supporting surface 5 of the insulating mass 4 at the periphery beyond the inner end parts of the wires the strips 6, 7 and 8 have edge parts 16 where a surrounding supporting part of the metal foil has been severed from the web parts which form the metal strips.

The outer flange of the metal shell has a locating tab 17 and the exposed metal components of the header that is the exposed parts of the shell, the strips 6, 7 and 8, the brazing rings 12 and the wires 3 have been successively electroless nickel plated and electroless gold plated.

Figure 4:
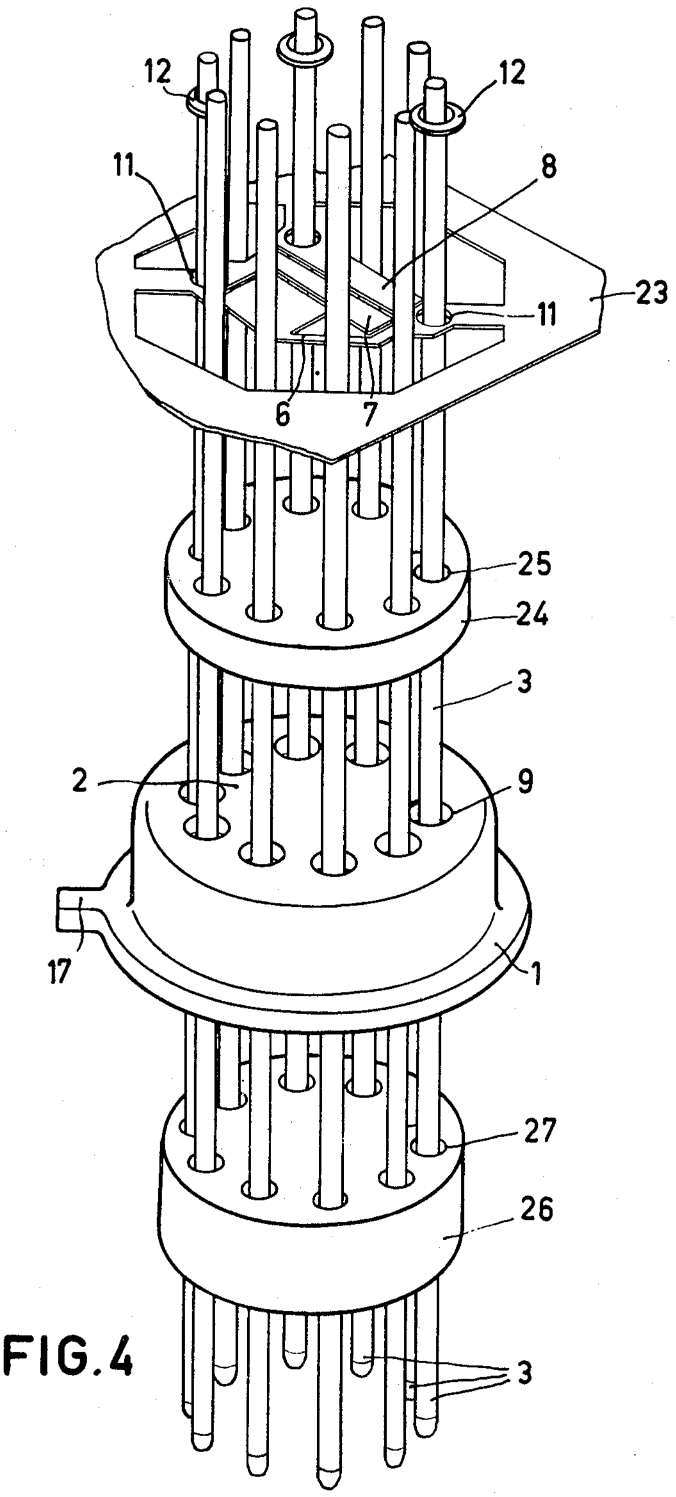
FIG. 4 is an exploded view of the component parts of the header prior to assembly.
Figure 5:
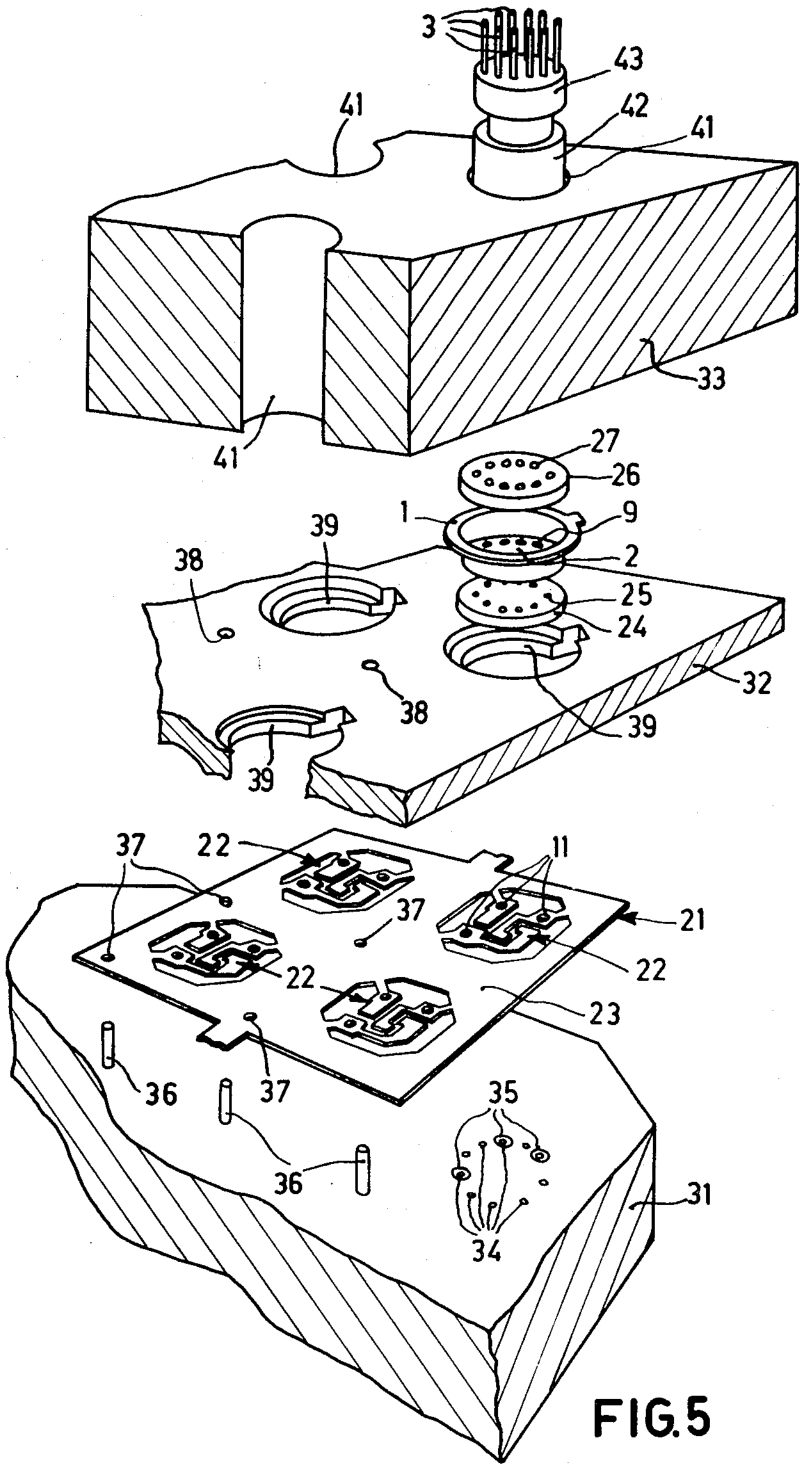
FIG. 5 is a perspective view of a jig in which the header is assembled and shows the loading sequence of the components of the header in the jig.

The manufacture of the header shown in FIGS. 1 to 3 will now be described. FIG. 4 shows the components of the header prior to assembly and FIG. 5 shows their loading sequence in a jig. The components consist of the silver clad nickel brazing rings 12, a large area foil 21 of nickel/iron/cobalt alloy (FIG. 5) having a plurality of web patterns 22 with surrounding support parts 23 arranged in units of four, a first borosilicate glass preform 24 having ten apertures 25 around the periphery, the shell (1,2) of nickel/iron/cobalt alloy having 10 apertures 9 in registration with the apertures 25 in the preform 24, a second borosilicate glass preform 26 having 10 apertures 27 in registration with the apertures 9 in the shell (1,2) and in registration with the apertures 25 in the preform 24, and ten wires 3 of the nickel/iron/ cobalt alloy. All these components are loaded into a multi-position carbon jug (FIG. 5) comprising three plates 31, 32 and 33. In the lower plate 31 at each 'position' there are ten bores 34 of a diameter sufficient to accomodate the wires 3. In three of the bores 34 there are counterbores 35 of a diameter and depth sufficient to accomodate the brazing rings 12. The initial stage of loading the jig is to place the brazing rings 12 in the counter-bores 35. The metal foil 21 is then located on the lower plate with pins 36 in the plate 31 fitting in apertures 37 in the foil. Hence the foil is located on the plate 31 with the apertures 11 in the web parts 6, 7 and 8 of the foil in registration and directly above the brazing rings 12. The center plate 32 of the jig is then placed on the lower plate 31 with the metal foil 21 sandwiched between the plates, the pins 36 in the lower plate 31 fitting in bores 38 in the center plate 32. The center plate has apertures 39 in which are located the first preform 24, the shell (1 ,2) and the second preform 26.

The top plate 33 of the jig is then located on the center plate with apertures 41 in the top plate in registration with the apertures 39 in the center plate 32. In each aperture 41 there is placed a weight 42 of annular section which rests on the surface of the outer flange 1 of the shell (1, 2) and a weight 43 having 10 apertures therein in registration with the apertures 25 and 27 in the preforms 24 and 26 respectively and in registration with the apertures 9 in the shell (1, 2). The weight 43 has a central spindle part extending through the weight 42 and resting on the preform 27. An excess quantity of wires, that is in excess of ten, are loaded in each aperture 41 above the top surface of the weight 43. The wires 3 have pointed ends which rest on the weight and insertion of seven of the wires into apertures in the weight 43 and thence into the apertures 27, 9, 25 and 34 and insertion of three of the wires into apertures in the weight 43 and thence into the apertures 27, 9, 25, 11 and (34, 35) is obtained by ultrasonic vibration of the loaded jig. The excess wires are then removed from the apertures 41.

The loaded jig having the wires 3 inserted in the apertures in the other components of the header is placed in a furnace and heated to 1,000° C in an atmosphere of nitrogen over a total period of 30 minutes. During this heating step the glass preforms 24 and 26 are fused to the metal shell (1, 2), to the web parts 22 of the foil 21, to the wires 3 and with the aid of the pressure exerted by the weights 42 and 43 are fused together through the apertures 9 in the metal shell (1, 2). The web parts of the foil are brazed to the wires 3 via the rings 12 during this heating step.

After cooling the jig the lower plate 31 is removed and with the aid of a cutting tool the surrounding parts 23 of the metal foil are severed from the web patterns 22 so that on each header the web pattern 22 yields the strips 5, 6 and 7. The assembled headers are then removed from the plates 32 and 33 of the jig. The exposed metal parts of the assembled header are then electroless nickel plated and finally electroless gold plated.

It will be appreciated that many modifications are possible which lie within the scope of the invention. Thus, for example, instead of the metal strips each being connected to a 'post', at least one metal strip may be isolated from the posts. This is readily achieved in a semiconductor device header according to the invention the metal strip forming a web part of the metal foil which is connected initially to the surrounding support part by a thin strip extending between the final location of two adjacent 'posts'. Furthermore the geometry and relative situation of the metal strips may be such as to permit encapsulation of devices other than multi-element integrated circuits, for example, multiple element diodes, opto-electronic devices or even single element semiconductor devices.

What is claimed is:

1. A method of manufacturing a plurality of semiconductor device headers comprising the steps of placing an apertured metal shell, an apertured glass preform, a single patterned metal foil having a plurality of web portions, each with an aperture, extending from a surrounding support part, and a plurality of wires in a jig with the glass preform sandwiched between the metal shell and the metal foil and metal wires passing through the shell and the glass preform and at least one of the wires passing through the aperture in each of the web portions, a brazing ring being located on the wire adjacent the foil, heating the jig with metal shell, glass preform, metal foil and wires therein to a temperature sufficient to fuse the glass preform to the metal shell, to the wires, to the metal foil, and the web part to the ring, and severing the web parts from the surrounding support part after heating to fuse the glass preform thereto.

2. A method as claimed in claim 1, in which the metal shell comprises an outer flange and an inner upstanding platform having a plurality of peripheral apertures, a first apertured glass preform being sandwiched between the platform and the metal foil and a second glass preform being located in the recess in the shell below the platform, each wire passing through as aperture in the first glass preform, through an aperture in the platform of the metal shell and through an aperture in the second glass preform, the jig being heated to fuse the preform to the shell and to each other through the apertures in the shell whereby also to insulate the wires from the shell.

3. A method of making a semiconductor device comprising placing a patterned metal foil having a plurality of wire receiving apertures on a glass member on a metal header through which the wires extend, heating the assembly to fuse the glass and bond it to the header and to the metal foil, severing parts of the metal foil for electrically insulating portions thereof, and providing a semiconductor device comprising a semiconductor body with electrodes and mounting the body on one of the insulated portions and connecting the electrodes to others of the insulated portions.

4. A method as set forth in claim 5 wherein the patterned metal foil comprises an annular surround uniting inwardly directed projections forming the portions to be isolated, the diameter of said surround substantially exceeds the diameter of said header and said glass member, and the severing step comprises removing the entire annular surround projecting beyond the periphery of the header and not bonded to the glass.

5. A method as set forth in claim 4 wherein the fusion step simultaneously seals the wires in an insulating manner to the header.

* * * * *